United States Patent
Van Den Brenk et al.

(10) Patent No.: US 11,358,161 B2
(45) Date of Patent: *Jun. 14, 2022

(54) PROCESS FOR PREPARING INFANT FORMULA USING A ROTARY ATOMIZER

(71) Applicant: N. V. NUTRICIA, Zoetermeer (NL)

(72) Inventors: Joep Van Den Brenk, Den Bosch (NL); Koen Cornelis Van Dijke, Leusden (NL); Raoul Charles Johan Moonen, Amersfoort (NL)

(73) Assignee: N. V. NUTRICIA, Zoetermeer (NL)

( * ) Notice: Subject to any disclaimer, the term of this patent is extended or adjusted under 35 U.S.C. 154(b) by 1432 days.

This patent is subject to a terminal disclaimer.

(21) Appl. No.: 14/917,984

(22) PCT Filed: Sep. 11, 2014

(86) PCT No.: PCT/EP2014/069354
§ 371 (c)(1),
(2) Date: Mar. 10, 2016

(87) PCT Pub. No.: WO2015/036464
PCT Pub. Date: Mar. 19, 2015

(65) Prior Publication Data
US 2016/0219911 A1  Aug. 4, 2016

(30) Foreign Application Priority Data

Sep. 13, 2013 (WO) .................. PCT/EP2013/069059

(51) Int. Cl.
*A23L 33/00* (2016.01)
*A23L 33/115* (2016.01)
(Continued)

(52) U.S. Cl.
CPC .............. *B05B 3/02* (2013.01); *A23L 33/115* (2016.08); *A23L 33/17* (2016.08); *A23L 33/19* (2016.08);
(Continued)

(58) Field of Classification Search
CPC ........ A23L 33/17; A23L 33/19; A23L 33/115; A23L 33/40; A23V 2002/00; A23V 2200/254
See application file for complete search history.

(56) References Cited

U.S. PATENT DOCUMENTS

| 5,773,061 A | 6/1998 | Getler et al. |
| 2008/0113067 A1 | 5/2008 | Sarma et al. |

(Continued)

FOREIGN PATENT DOCUMENTS

| EP | 2638810 A1 | 9/2013 |
| EP | 2638811 A1 | 9/2013 |

(Continued)

OTHER PUBLICATIONS

Perez-Munoz, "Effect of processing parameters on spray drying of full-fat soymilk" Available online at https://lib.dr.iastate.edu/rtd in 1996. (Year: 1996).*

(Continued)

*Primary Examiner* — Erik Kashnikow
*Assistant Examiner* — Assaf Zilbering
(74) *Attorney, Agent, or Firm* — Harness, Dickey & Pierce, P.L.C.; Stephen T. Olson

(57) ABSTRACT

The present invention relates to a process for preparing a spray-dried lipid and protein component-containing composition using a rotary atomizer, which composition comprises large lipid globules, preferably coated with polar lipids, and to the compositions obtained thereby. The obtained compositions are preferably for feeding infants and young children.

18 Claims, 2 Drawing Sheets

Figure 1:
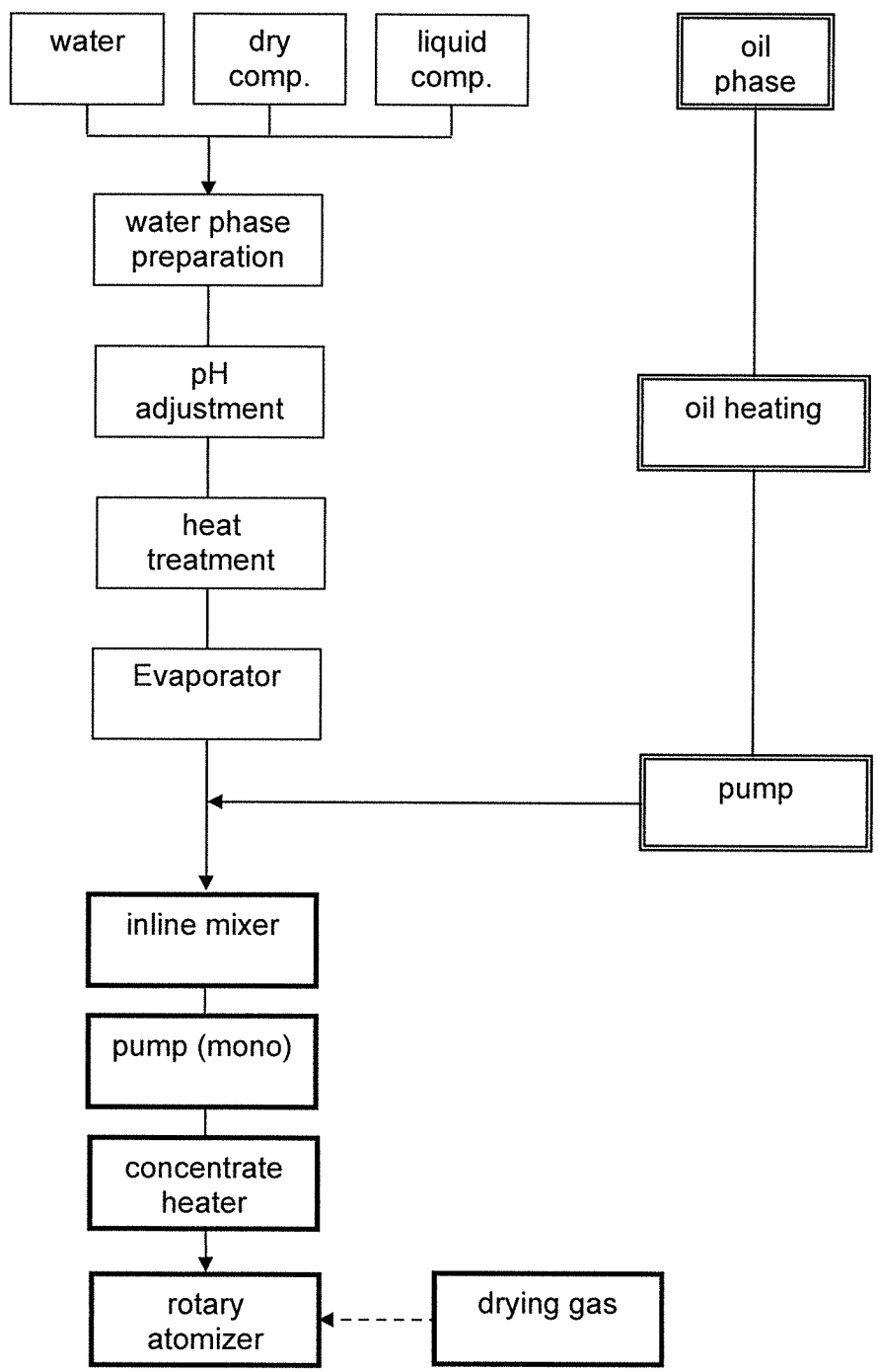

(51) Int. Cl.
  *A23P 10/40* (2016.01)
  *A23L 33/19* (2016.01)
  *A23L 33/17* (2016.01)
  *B05B 3/02* (2006.01)

(52) U.S. Cl.
  CPC .............. *A23L 33/40* (2016.08); *A23P 10/40* (2016.08); *A23V 2002/00* (2013.01)

(56) References Cited

U.S. PATENT DOCUMENTS

| | | |
|---|---|---|
| 2010/0034940 A1 | 2/2010 | Sarma et al. |
| 2011/0206743 A1 | 8/2011 | Van Baalen et al. |
| 2011/0217411 A1 | 9/2011 | Van Der Beek et al. |
| 2011/0300225 A1 | 12/2011 | Van Der Beek et al. |
| 2014/0093554 A1 | 4/2014 | Van Der Beek et al. |

FOREIGN PATENT DOCUMENTS

| | | | |
|---|---|---|---|
| EP | 2825062 B1 | 5/2017 | |
| EP | 3043659 B1 | 11/2019 | |
| FR | 2913857 A1 | 9/2008 | |
| WO | WO-2010/027258 A1 | 3/2010 | |
| WO | WO-2010/068086 A1 | 6/2010 | |
| WO | WO-2010068105 A1 * | 6/2010 | ............. A61K 35/20 |
| WO | WO-2012130468 A1 * | 10/2012 | ............. A23L 33/115 |
| WO | WO-2013/067603 A1 | 5/2013 | |
| WO | WO-2013067603 A1 * | 5/2013 | ................ A23J 3/00 |
| WO | WO-2013/138906 A1 | 9/2013 | |

OTHER PUBLICATIONS

Schmitz-Schug, et al., "Impact of the spray drying conditions and residence time distribution on lysine loss in spray dried infant formula" (from Dairy Sci& Technol. (2013) 93:443-462). (Year: 2013).*
International Search Report and Written Opinion of the ISA for PCT/EP2014/069354, ISA/EP, Rijswijk, NL, dated Dec. 18, 2014.
International Preliminary Report on Patentability (Ch.II) with annexes for PCT/EP2014/069354, IPEA/EP, Rijswijk, NL, dated Dec. 2, 2015.
Notice of Opposition received for the European Patent Application No. 14765917.1, dated Sep. 1, 2020, 8 pages.
Dairy Processing Handbook, Chapter 17, 1995, 15 pages.
Mujumdar, Handbook of Industrial Drying, Third Edition, Chapter 10.2.2.2, 2006, 4 pages.
Milk Powder Technology, GEA Process Engineering, 2010, pp. 99 and 295.
Static Mixing, Reaction, Heat Transfers Fluid Dynamics Technology, Stamixco, Brochure on Static Mixers, 2007, 8 pages.
Thakur et al, Static Mixers in The Process Industries—A Review, Trans IChemE, vol. 81. Part A, Aug. 2003, pp. 787-826.
Harnby et al, Mixing in the Process Industries, 2nd Edition 1992, pp. 126-127.
Paul et al, Handbook of Industrial Mixing, Science and Practice, 2004, p. 400 and 646.
Couvrer et al, Composition of Milk Fat from Cows Selected for Milk Fat Globule Size and Offered Either Fresh Pasture or a Corn Silage-Based Diet, Journal of Dairy Science, vol. 90, pp. 392-403.
Data Sheet for T 50 Ultra-Turrax disperser, IKA, 2012, 1 page.
DynaShearc—Sanitary Inline High Shear Mixer, Admix Home : All Equipment: Inline Mixing and Milling : DynaShear, Dec. 28, 2011, 4 pages.
Hall et al, Droplet Break-Up by In-Line Silverson Rotor-Stator Mixer, Chemical Engineering Science, vol. 66, 2011, pp. 2068-2079.
Murphy et al, A High-Solids Steam Injection Process for The Manufacture of Powdered Infant Milk Formula, 2013, vol. 93, No. 4, pp. 463-475.

* cited by examiner

PROCESS FOR PREPARING INFANT FORMULA USING A ROTARY ATOMIZER

CROSS-REFERENCE TO RELATED APPLICATIONS

This application is a 371 U.S. National Stage of International Application No. PCT/EP2014/069354, filed on Sep. 11, 2014, which claims the benefit of and priority to International Application No. PCT/EP2013/069059, filed on Sep. 13, 2013. The entire disclosures of the above applications are incorporated herein by reference.

The present invention relates to a process for preparing a spray-dried lipid and protein component-containing composition comprising large lipid globules, preferably coated with polar lipids, and to the compositions obtained thereby. The obtained compositions are preferably for feeding infants and young children.

Infant or follow-on formulae are used successfully for feeding infants in cases where breast-feeding is impossible or less desirable. Still, the composition of such formulations should resemble breast milk as closely as possible, which is the preferred method of feeding infants to accommodate the special nutritional requirements of the fast growing and developing infant.

In natural unprocessed mammalian milk, lipids occur primarily as triglycerides contained within emulsified globules with a mean diameter of approximately 4 µm. These globules are surrounded by a structural membrane composed of phospholipids (0.2 to 1% based on total fat), cholesterol, enzymes, proteins, and glycoproteins. The major part of the fat component used in infant or follow-on formulae is of vegetable origin. The use of a large part of cow's milk fat is less desirable, because of a more unfavourable fatty acid profile. Additionally, long-chain polyunsaturated fatty acids of microbial, fish or egg origin are typically added to improve the fatty acid profile.

In known processes for preparing infant or follow-on formulae the fat or lipid phase comprising lipids and lipid-soluble vitamins is mixed vigorously with the aqueous phase comprising proteins and carbohydrates and the mixture is homogenised under high pressure by a conventional high pressure homogeniser alone or in combination with a high pressure pump. Also during spray-drying high pressures are used to obtain a powdered form of the emulsion. Thus, during homogenisation the fat phase is compartmentalized into smaller droplets so that it no longer separates from the aqueous phase and collects at the top, which is called creaming. This is accomplished by forcing the mixture at high pressure through a small orifice. This homogenisation step results in a stable oil-in-water emulsion, comprising lipid globules with a mode volume-weighted diameter of 0.1 to 0.5 µm. Due to this small globule size, which results in an increased lipid globule surface area, the relatively small amount of polar lipids, such as phospholipids, typically present in such compositions wherein the fat is mainly of vegetable origin is not sufficient to ensure that the distribution of the phospholipids corresponds to unprocessed lipid globules. Instead, the amount of protein, in particular casein, covering the lipid globule increases.

This is in contrast with the structure of lipid globules in unprocessed or raw milk, such as human milk, wherein the lipid globules are larger and the lipid globules are covered with a milk globule membrane comprising polar lipids in higher quantities than the above described processed IMF (infant milk formula). The preparation of larger lipid globules is thus desirable in order to prepare infant or follow-on formulae which more closely resemble human milk. Nutritional compositions with vegetable fat having larger lipid globules were also recently found to have long term health benefits with regard to body composition and prevention of obesity later in life. WO 2010/027258 discloses nutritional compositions with vegetable fat having larger lipid globules which are produced by applying a homogenisation step using lower pressure. WO 2010/027259 discloses nutritional compositions with larger lipid globules coated with polar lipids using a homogenisation step with a lower pressure and a higher amount of polar lipids, in particular phospholipids, present before homogenisation.

WO 2010/027258, WO 2010/027259, WO 2011/108918 and WO 2010/068105 disclose the preparation of nutritional compositions comprising a process step of mixing an aqueous phase with an oil blend using an Ultra-Turrax T50 batch mixer. In the mixing chamber of a batch mixer heterogenous mixing conditions are present, resulting in a broad lipid droplet size distribution and the formation of partially very large lipid globules. Furthermore, the liquid phases to be mixed are subjected in a batch mixer for an extended time to changing mixing conditions thereby reinforcing the upper identified effects of producing a broad droplet size distribution and forming extremely small and extremely large lipid globules. Due to inhomogeneous mixing a batch mixer disadvantageously has a higher risk of large and small fat globules.

WO 2005/051091 relates to a lipid preparation which mimics the lipid phase of human milk. The lipid preparation is produced by a homogenisation step to form a substantially homogeneous dispersion or emulsion under suitable conditions which include temperature, pressure and physical manipulation.

Borel et al. (J of Parenteral and Enteral Nutrition (1994), 18, 534-543) discloses the preparation of tube-feeding emulsions with different droplet sizes and compositions for feeding rats, wherein an emulsion from a lipid and an aqueous phase is prepared by magnetically stirring the mixture with a magnetic bar and further refining the prepared emulsion by sonification. Such a process is not suitable for a larger scale and will give too large variation in the globule size.

Thus, most of these known processes employ high pressure mixing devices, in particular homogenisers and/or high pressure pumps. In the processes employing homogenisers mostly two pressure steps are needed resulting in a capital intensive production process. Further, if low pressures are used with these homogenisers which are especially designed to use high pressures to allow for homogenisation, the operation process is hard to control in a stable way, that means the process needs a high amount of additional control, which is laborious, time consuming and can result in varying end product qualities. Thus, the commercially used machinery is overdimensioned and has a low energy efficiency rendering these processes less preferred for an economical production. The same holds true for the high pressure pumps and devices used for spray-drying.

The technical problem underlying the present invention is therefore to provide a process for the preparation of a spray-dried lipid and protein component-containing composition comprising large lipid globules, preferably coated with polar lipids, which allows to produce said composition without the above mentioned disadvantages.

The technical problem underlying the present invention is therefore also to provide spray-dried lipid and protein component-containing compositions which overcome the above-identified disadvantages, in particular comprise a controllable, reproducible, lipid globule size.

These technical problems are solved by the processes and the products according to the independent claims.

Thus, the present invention provides in particular a process for preparing a spray-dried lipid and protein component-containing composition, which is a spray-dried infant or follow-on formula or growing up milk and comprises lipid globules, wherein a lipid and protein component-containing composition comprising lipid globules is spray-dried with an atomization system employing a rotary atomizer so as to obtain a spray-dried lipid and protein component-containing composition comprising lipid globules having a volume-weighted mode diameter of at least 1 µm and/or lipid globules wherein at least 45% of said lipid globules have a diameter from 2 to 12 µm (% based on vol.-%). Preferably, the atomization system employing a rotary atomizer is a low shear atomization system.

Surprisingly, it was found that by using a lipid and protein component-containing composition, which is a large lipid globule emulsion with a lower apparent dynamic viscosity in the present process advantageously and preferably enables a high total solid content, resulting in more economical spray-drying. Concomitantly, by applying the process according to the present invention a higher smouldering temperature, in particular a smouldering temperature of from 190° C. to 210° C., preferably of from 195° C. to 200° C., can be achieved during spray-drying which preferably and beneficially allows the use of higher temperatures during spray-drying allowing an increased capacity of the spray dryer, i. e. the atomization system. In prior art processes smouldering temperatures of around 185° C. are typically achieved.

The present process is further characterised by a very good controllability and reproducibility.

Thus, preferably and advantageously, with the lipid and protein component-containing composition used in the present spray-drying process the smouldering temperature is higher, enabling a higher temperature during spray-drying, which is economically an advantage. Without wishing to be bound by theory, the higher smouldering temperature might be due to the reduced surface area of the large lipid globules.

In the context of the present invention the term "smouldering temperature" means the temperature at which the product starts an exothermic reaction, that means when a certain amount of energy is reached. This normally occurs in lumps of the product which insulate the core of the lump and allow for a temperature increase. This needs a certain initial temperature and a certain time to start. When the reaction starts the powder product starts to self ignite and the higher the temperature the faster the reaction progresses. Thus, from a safety point of view there is a maximum temperature at which a powder can be dried. Drying at a higher temperature bears the risk of the formation of an ignition source which might lead to an explosion in the dryer. Thus, the smouldering temperature means auto ignition temperature which is different for a specific powder and depends on a number of variables. The present process advantageously allows for a higher smouldering temperature, that means the temperature at which the risk of self ignition of the powder exists is higher than in known processes.

In the context of the present invention the term "spray-drying" refers to a process of transforming a feed from a fluid state into a dried particulated form, in particular by spraying the feed into a hot drying medium. Preferably, spray-drying involves a step of atomization of the liquid feed into fine droplets, of mixing these droplets with a heated gas stream allowing the liquid to evaporate and leave dried solids and optionally separating the dried product from the gas stream to be collected.

Preferably, the liquid feed may be a solution, slurry, emulsion, gel or paste and must be capable of being atomized. The process preferably involves bringing together a highly dispersed liquid and a sufficient volume of hot gas, in particular air, to produce evaporation and drying of the liquid droplets obtained by the atomization. Preferably, the air supplies heat for evaporation and conveys the dried product to a collector.

In the context of the present invention, an atomizer is an equipment, which breaks bulk liquid into small droplets forming a spray.

In the context of the present invention, a rotary atomizer, also called a wheel or a disc atomizer, is an atomizer, which uses energy of a high-speed rotating wheel to divide bulk liquid into droplets. Preferably, the feed is introduced at the centre of the wheel, flows over the surface to the periphery and disintegrates into droplets when it leaves the wheel.

Once the liquid is atomized it is brought into intimate contact with the heated gas for evaporation to take place equally from the surface of all droplets within the drying chamber. The heated gas is preferably introduced into the chamber by an air disperser, which ensures that the gas flows equally to all parts of the chamber.

The atomization system, preferably the low shear atomization system, of the present invention, hereinafter also called spray dryer, employs a rotary atomizer which preferably exerts low shear forces onto the lipid and protein component-containing composition to be spray-dried.

In a preferred embodiment of the present invention, the rotary atomizer is configured and operated in such a way so as to achieve the desired particle size distribution of the obtained composition.

In the context of the present invention, the configuration of said rotary atomizer is preferably determined by the wheel diameter.

In the context of the present invention, the operating conditions used with the present rotary atomizer are preferably the tip speed of the wheel, the rotational speed of the wheel and the inlet temperature of the air introduced into the spray dryer.

In particular, the present invention employs a rotary atomizer having a wheel diameter of 100 to 250 mm, more preferably of 100 to 150 mm, most preferred of 120 mm.

In a furthermore preferred embodiment of the present invention the rotary atomizer is operated with a tip speed of the wheel from 50 to 120 m/s, preferably from 60 to 100 m/s, more preferably from 65 to 95 m/s, most preferred from 70 to 90 m/s.

In a preferred embodiment of present invention, the rotational speed employed in the rotary atomizer, hereinafter also termed wheel speed, is from 10000 to 15000 rpm (rotations per min), preferably 11000 to 14000, preferably 11000 or 14000 rpm.

The above mentioned parameters of wheel diameter, tip speed and wheel speed of the rotary atomizer are interlinked, which means that if one is changed, the other two will change as well. In context of the present invention, tip speed is the parameter most preferred.

In a furthermore preferred embodiment of the present invention the inlet temperature employed in the atomization system, that means the spray dryer, is from 160 to 210° C., preferably from 170 to 200° C., preferably 175 to 195° C., preferably 175° C. or 193° C.

In a preferred embodiment of the present invention, the atomization system is employed with a tip speed of 65 to 95 m/s, preferably 70 to 90 m/s and an inlet temperature of the spray dryer of 160 to 210° C. In a furthermore preferred embodiment of the present invention, the atomization system is employed with a tip speed of 65 to 95 m/s, preferably 70 to 90 m/s and an inlet temperature of the spray dryer of 193° C. In a furthermore preferred embodiment of the present invention, the atomization system is employed with a tip speed of 65 to 95 m/s, preferably 70 to 90 m/s and an inlet temperature of the spray dryer of 175° C.

The specific type of rotary atomizer to be used can be determined accordingly by a skilled person under the condition that the large lipid globules contained in the lipid and protein component-containing composition are only subjected to shear forces, which preferably do not exceed the shear forces experienced during production of the lipid and protein component-containing composition, that means during mixing.

Furthermore preferred, the drying gas has an inlet temperature of at least 150° C., preferably at least 160° C., preferably at least 170° C., preferably at least 175° C., preferably at least 180° C., preferably at least 190° C., more preferably 193° C. or 195° C.

In a particularly preferred embodiment the total solid content of the lipid and protein component-containing composition, in particular mixture, to be atomized has a dry matter content of 30 to 65 wt. %, preferably 40 to 60 wt. %, more preferably 50 to 60 wt. %.

Preferably, the lipid globules, also called lipid droplets, of the spray-dried composition produced with the process according to the present invention have a volume-weighted mode diameter of at least 1 μm, preferably of at least 2 μm, more preferably of at least 3 μm, most preferred of at least 3.5 μm, even more preferably about 4 μm. Preferably, the volume-weighted mode diameter should be below 20 μm, preferably below 15 μm, preferably below 10 μm, more preferably below 7 μm. In particular, the lipid globules of the spray-dried composition produced with the process according to the present invention have a volume-weighted mode diameter from 1 to 15 μm, preferably 2 to 12 μm, preferably 1 to 10 μm, preferably from 2 to 8 μm, more preferably from 3 to 8 μm, most preferred from 3 to 5 μm, preferably 4 to 7 μm, in particular 4 to 5 μm. The term "volume-weighted mode diameter" (or mode diameter based on volume) relates to the diameter which is the most present based on volume of total lipid, or the peak value in a graphic representation, having on the x-axis the diameter and on the y-axis the volume in %.

Preferably, the lipid globules, also called lipid droplets, of the spray-dried composition produced with a process according to the present invention are lipid globules, wherein at least 45%, preferably at least 57%, more preferably at least 60%, preferably at least 65%, preferably at least 70% (each % based on volume of the lipid globules) have a diameter from 2 to 12 μm, preferably 3 to 11, preferably 3 to 5 μm.

Preferably at least 45%, preferably at least 57%, more preferably at least 60% (based on volume) of the lipid globules have a diameter from 2 to 12 μm.

The present teaching, in particular the present process, thus results in the production of lipid globules having a volume-weighted mode diameter more close to the diameter of natural human milk lipid globules, which can be coated by a membrane of polar lipids, if desired, leading to a further resemblance of natural milk lipid globules. Advantageously, these features are also preserved after spray-drying, in particular after subsequent reconstitution in an aqueous medium. Thus, upon reconstitution with water the spray-dried composition prepared by the present process still displays these features. The spray-dried composition obtainable, preferably obtained, by the process according to the present invention thus very closely resembles human milk upon reconstitution with an aqueous medium.

The compositions obtained according to the present processes exhibit improved powder properties and an improved homogeneity. Further, the fat content and the particle size distribution of the present compositions is well controllable. It was found that the powdered composition obtained by the present process had good shelf-life stability. The powder had an excellent wettability and dissolvability properties upon reconstitution with water, which was improved when compared with powder of standard formula with smaller lipid globules.

Preferably, the spray-dried lipid and protein component-containing composition is obtained subsequent to spray-drying according to the present invention as a spray-dried powder which preferably can then be filled in appropriate containers. Thus, the present composition is in one embodiment in solid form, preferably spray-dried form, preferably powdered form.

In a particularly preferred embodiment further components which are already present in dry form, such as some minerals, vitamins, and non digestible oligosaccharides are dry blended into the spray-dried lipid and protein component-containing composition before it is filled into containers.

However, the present spray-dried composition may also be in liquid form, preferably after reconstitution of the obtained spray-dried form in an aqueous medium.

In a particularly preferred embodiment the present invention further provides a process for preparing a lipid and protein component-containing composition used as an educt for spray-drying, which is an infant or follow-on formula or a growing up milk and comprises lipid globules, comprising the steps of a) providing an aqueous phase with a dry matter content of 10 to 60 wt. % (based on total weight of the aqueous phase), which comprises at least one protein component, b) providing a liquid lipid phase, which comprises at least one lipid and c) mixing the lipid phase with the aqueous phase in a ratio of 5 to 50% (w/w) using an inline mixer with at least one mixing head or a static mixer, preferably exerting a low shear force, so as to obtain a lipid and protein component-containing composition comprising lipid globules which can be subjected to the present spray-drying process.

Surprisingly, it was found that by using an inline mixer or a static mixer such a composition could be produced with much better control and reproducibility of lipid droplet size. The process additionally has the advantages that an overdimensioned machinery is not necessary and energy is used more efficiently.

Without wishing to be bound by theory, the present advantages obtained may be due to the lower shear forces experienced by the lipid droplets or globules of the composition during the production process compared to standard homogenization processes. Typically, employing an inline mixer, even when used at high speed, exerts lower shear forces than conventional homogenization. Even though such in line mixers sometimes are referred to as "high shear inline mixers", the shear forces applied on the lipid globules employing such inline mixers is still lower than with conventional homogenisation. For the present invention this is still regarded as exerting a low shear force. In particular and preferably, lower shear forces are applied during the course of the present production process starting from the mixing of the aqueous and lipid phases using an inline mixer with at least one mixing head or a static mixer and also during spray-drying of the composition using a low shear atomization system which applies lower shear forces as well. Preferably, high shear forces are already avoided from the point the lipid phase is fed into the aqueous phase, which might occur before or during mixing. Therefore, by using the preferred process according to the present invention employing an inline mixer or a static mixer an emulsion, preferably a stable oil-in-water emulsion of large lipid globules, with improved properties is provided without the need of a (two-step) homogenisation allowing both a more economical and more convenient production as well as the provision of improved nutritional compositions. Thus, the present process preferably and advantageously does not involve high pressure and/or high energy input homogenisation devices, in particular does not use sonification or a (two-step) homogeniser, but instead uses an atomization system, preferably a low shear atomization system, preferably exerting low shear forces, and preferably a static mixer or a medium or high speed inline mixer with at least one mixing head. This is advantageous in so far as homogenisers typically used for such processes exert high shear forces, such as resulting from pressures of 50 to 150 bar in conventional homogenizers, whereas the atomization system and the inline mixer preferably used in the present process preferably apply low shear forces even when operated with medium to high speed.

Dynamic high pressure is conventionally used in the food industry and is sometimes also referred to as high pressure valve homogenisation.

In a preferred embodiment of the present invention, the present process does not use a dynamic high pressure homogeniser or a dynamic high pressure homogenisation step.

In a preferred embodiment of the present invention, the present process does not use a dynamic high pressure one-step homogeniser or a dynamic high pressure one-step homogenisation process.

In a preferred embodiment of the present invention, the present process does not use a dynamic high pressure two-step homogeniser or a dynamic high pressure two-step homogenisation process.

In the context of present invention, the term "the present process", preferably encompasses a process for preparing a spray-dried lipid and protein component-containing composition, which is a spray-dried infant or follow-on formula or growing up milk and comprises lipid globules, wherein a lipid and protein component-containing composition comprising lipid globules is spray-dried with an atomization system employing a rotary atomizer so as to obtain a spray-dried lipid and protein component-containing composition comprising lipid globules having a volume-weighted mode diameter of at least 1.0 μm and/or lipid globules wherein at least 45% of said lipid globules have a diameter from 2 to 12 μm (% based on vol.-%) and, if applied for the provision of said lipid and protein component-containing composition to be used as educt for the present spray-drying process, employing optional preceding process steps a), b), c) and, if applied, an optional premixing step following process steps a) and b) and before conducting process step c).

Preferably, the present process consists of a process for preparing a spray-dried lipid and protein component-containing composition, which is a spray-dried infant or follow-on formula or growing up milk and comprises lipid globules, wherein a lipid and protein component-containing composition comprising lipid globules is spray-dried with an atomization system employing a rotary atomizer so as to obtain a spray-dried lipid and protein component-containing composition comprising lipid globules having a volume-weighted mode diameter of at least 1.0 μm and/or lipid globules wherein at least 45% of said lipid globules have a diameter from 2 to 12 μm (% based on vol.-%). Most preferably, the present process consists of step a), step b), premixing the lipid and protein containing composition, step c) and the above-identified present process step of spray drying with an atomization system employing a rotary atomizer Preferably, the present process consists of step a), step b) and step c) and the above-identified present process step of spray-drying with an atomization system employing a rotary atomizer.

A preferred process for preparing the lipid and protein component-containing composition according to the present invention requires, preferably in preferred step a), the provision of an aqueous phase with a dry matter content of 10 to 60 wt. %, preferably 15 to 55 wt. %, more preferably 20 to 50 wt. %, even more preferred 25 to 50 wt. %, most preferably 25 to 45 wt. %, preferred 30 to 50 wt. % (each based on total weight of the aqueous phase), comprising at least one protein component.

It is furthermore preferred to provide the aqueous phase with a dry matter content of 30 to 60 wt. %, preferably 35 to 50 wt. %, more preferably 40 to 50 wt. %.

In the context of the present invention the term "protein component" refers to proteinaceous matter in general, which includes proteins, peptides, free amino acids but also compositions comprising proteins, peptides and/or free amino acids, i. e. are sources of protein.

The source of the protein, that means the protein component, is preferably selected in such a way that the minimum requirements of an infant for essential amino acid content are met and satisfactory growth is ensured. Hence, protein components based on cow's milk proteins such as whey, casein and mixtures thereof and proteins based on soy, potato or pea are preferred. In case whey proteins are used, the protein component is preferably based on acid whey or sweet whey, whey protein isolate or mixtures thereof and may include α-lactalbumin and β-lactoglobulin.

In a preferred embodiment the aqueous phase also contains at least one further component selected from the group consisting of digestible carbohydrates, non-digestible carbohydrates, vitamins, in particular water-soluble vitamins, trace elements and minerals, preferably according to international directives for infant formulae.

To prepare the aqueous phase, hereinafter also called "compounding", the at least one protein component and the above described optional further components are compounded in the aqueous phase, in particular an aqueous medium, preferably water. For this the at least one protein component as well as all other optional components may be in a dry state or present as solutions or suspensions.

Thus, said aqueous phase may be prepared for said provision step by compounding the at least one protein component and optional further components in an aqueous phase, preferably water, in the desired dry matter content. In case an aqueous phase comprising at least one protein component and optional further components is available having a lower dry matter content below 40 wt. %, such as 25 wt. %, it may in a preferred embodiment be foreseen to concentrate, preferably evaporate, said aqueous phase, preferably by using an evaporator, prior to step a) of the present process to yield the required dry matter content.

In a preferred embodiment this evaporation step is conducted after an optional high heat treatment (HHT). The preferred evaporation step can be performed on the aqueous phase or, in an alternative embodiment, on the mixture of the aqueous and lipid phase, preferably after homogenisation.

Preferably, after compounding all required components in the aqueous phase the pH of the aqueous phase is adjusted to 6.0 to 8.0, more preferably to 6.5 to 7.5.

Optionally, the aqueous phase is filtered by appropriate means to prevent an entering of foreign bodies, for instance impurities or pathogens, into the process.

Optionally, the aqueous phase is pasteurised or heat treated first by a preheating step, wherein the aqueous phase is heated to 60 to 100° C., preferably to 70 to 90° C., more preferably to 85° C. with a holding time of 1 second to 6 minutes, more preferably 10 seconds to 6 minutes, even more preferably 30 seconds to 6 minutes. This leads to a pre-sterilisation of the aqueous phase.

In a preferred embodiment, preferably after preheating, the aqueous phase preferably undergoes a high heat treatment (HHT), wherein it is heated to temperatures over 100° C., preferably 120 to 130° C., most preferred to 124° C. This temperature is preferably held for 1 to 4 seconds, more preferably for 2 seconds.

Alternatively, other suitable methods of pasteurisation or sterilisation can be applied. Several pasteurization and sterilisation methods are known in the art and are commercially feasible.

Preferably, the HHT is performed prior to an optionally performed concentration step, preferably evaporation step.

In a preferred embodiment of the present invention the HHT is performed on the aqueous phase alone. Accordingly, the lipid phase is added thereafter resulting in the mixing and homogenisation of the aqueous and lipid phase. In another embodiment of the present invention the HHT is performed on the mixture of the aqueous and lipid phase. This embodiment allows to customize the obtained oil blend.

Optionally, the aqueous phase is again filtered by appropriate means to remove potentially produced burnt particles. Thus, it is preferred that neither the aqueous phase nor the produced lipid and protein component-containing composition contains burnt particles.

During compounding of the aqueous phase the employed shear forces are not critical. Thus, the aqueous phase may be compounded using high shear forces.

In the lipid and protein containing composition, in particular in step b) of the preferred process for preparing the lipid and protein component-containing composition according to the present invention, it is preferred to provide a liquid lipid phase, which comprises at least one lipid, preferably at least one vegetable lipid. The presence of vegetable lipids advantageously enables an optimal fatty acid profile, high in (poly)unsaturated fatty acids and/or more reminiscent to human milk fat. Using lipids from cow's milk alone, or other domestic mammals, provides not in any case an optimal fatty acid profile. In particular, such a less optimal fatty acid profile, such as a large amount of saturated fatty acids, is known to result in increased obesity.

Preferably part of the fat, that means lipid, is milk fat, more preferably anhydrous milk fat and/or butter oil. Commercially available lipids for use in the present invention preferably are in the form of a continuous oil phase. The spray-dried composition obtained by the present process preferably comprises 2.1 to 6.5 g lipids, preferably vegetable lipid, per 100 ml, more preferably 3.0 to 4.0 g per 100 ml, when in liquid form, that means reconstituted with water, for instance as a ready-to-feed liquid.

Based on dry weight the spray-dried composition obtained by the present process preferably comprises 10 to 50 wt. %, more preferably 12.5 to 45 wt. %, preferably 12.5 to 40 wt. %, even more preferably 19 to 30 wt. % lipids.

Preferably, the lipid phase comprises 30 to 100 wt. % vegetable lipids based on total lipids, more preferably 50 to 100 wt. %. Preferably, the lipid phase comprises at least 75 wt. %, more preferably at least 85 wt. % triglycerides based on total lipids.

Preferably, the lipid phase comprises further components such as fat-soluble vitamins, preferably according to international directives for infant formulae.

According to the present invention it is preferred that the lipid phase is liquid at the temperature(s) used during the process. However, if the lipid phase is solid due to its composition it is preferably heated to above the melting temperature of the at least one lipid, preferably vegetable lipid, contained in the lipid phase. In a particularly preferred embodiment of the present invention the lipid phase is heated to a temperature above its melting point, preferably to a temperature of 40 to 80° C., preferably 50 to 70° C., more preferably to 55 to 60° C. thereby resulting in a liquid lipid phase. Most preferably, the lipid phase is heated to a temperature of at least 40° C., preferably at least 45° C., more preferably at least 50° C., most preferred to at least 55° C.

If required, the lipid phase is preferably filtered by appropriate filtration devices prior to the next step, preferably step c), to prevent foreign bodies, for instance impurities or pathogens, from entering the production process.

The lipid or fat globules of natural human milk comprise a globule membrane which comprises polar lipids, in particular phospholipids. Thus, it is desirable to provide an infant formula comprising lipid globules comprising a membrane or coating of polar lipids, in particular phospholipids. Thus, in a particularly preferred embodiment of the present process the aqueous phase, the lipid phase, or the aqueous and the lipid phase comprise polar lipids, preferably phospholipids, in particular comprise added polar lipids, preferably phospholipids. If the polar lipids, in particular phospholipids, are relatively pure, preferably do not contain significant quantities of other components, preferably are pure, such as soy lecithin, they are preferably added to the lipid phase. In case the polar lipids, in particular phospholipids are impure, preferably relatively impure and therefore contain significant quantities of other components which are not dissolvable in the fat or lipid phase, such as when they are present in butter milk serum powder, they are preferably added to the aqueous phase. Most preferred, the polar lipids, in particular phospholipids are comprised in the aqueous phase.

In a preferred embodiment of the present invention, the polar lipids are already contained in the lipid phase to be used according to the present invention. In a furthermore preferred embodiment the polar lipids are added into the aqueous or the lipid phase or both provided in steps a) or b) of the present process. In a furthermore preferred embodiment the polar lipids may also be added during process step c) during mixture of the lipid and the aqueous phase.

If polar lipids are present in either the aqueous phase, which is preferred, or the lipid phase or in both, the lipid globules preferably become coated with the polar lipids.

By "coated" or "coating" is meant that the outer surface layer of the lipid globule comprises polar lipids, whereas these polar lipids are virtually absent from the core of the lipid globule. The presence of polar lipids as a coating or outer layer of the lipid globule resembles the structure of lipid globules of human milk.

Polar lipids preferably also comprise phospholipids. Preferably, the compositions comprise 0.5 to 20 wt. % phospholipids based on total lipid, more preferably 0.5 to 10 wt. %, more preferably 1 to 10 wt. %, even more preferably 2 to 10 wt. % even more preferably 3 to 8 wt. % phospholipids based on total lipid.

Preferred sources for providing the phospholipids are egg lipids, milk fat, buttermilk fat and butter serum fat, such as beta serum fat. A preferred source for phospholipids, particularly PC (phosphtidylcholine), is soy lecithin and/or sunflower lecithin. The compositions preferably comprise phospholipids derived from milk.

Preferably, the polar lipids are located on the surface of the lipid globule, that means as a coating or outer layer after the mixing step c) of the present process. This advantageously also leads to more stable lipid globules. A suitable way to determine whether the polar lipids are located on the surface of the lipid globules is laser scanning microscopy.

The concomitant use of polar lipids derived from domestic animals milk and triglycerides derived from vegetable lipids therefore enables to manufacture coated lipid globules with a coating more similar to human milk, while at the same time providing an optimal fatty acid profile. Suitable commercially available sources for milk polar lipids are BAEF, SM2, SM3 and SM4 powder of Corman, Salibra of Glanbia, and LacProdan MFGM-IO or PL20 from Aria. Preferably at least 25 wt. %, more preferably at least 40 wt. %, most preferably at least 75 wt. % of the polar lipids is derived from milk polar lipids.

The lipid globules produced by the present process preferably comprise a core and preferably a coating, wherein the core comprises a lipid, preferably vegetable lipid. Preferably, the core comprises at least 90 wt. % triglycerides, more preferably consists of triglycerides. The coating preferably comprises polar lipids, in particular phospholipids, wherein not all polar lipids that are contained in the composition need to be comprised in the coating. Preferably, at least 50 wt. %, more preferably at least 70 wt. %, even more preferably at least 85 wt. %, most preferred more than 95 wt. % of the polar lipids, in particular phospholipids present in the composition are comprised in the coating of the lipid globules. Also, not all lipids, preferably vegetable lipids, present in the composition necessarily need to be comprised in the core of the lipid globules. Preferably, at least 50 wt. %, more preferably at least 70 wt. %, even more preferably at least 85 wt. %, even more preferably at least 95 wt. %, most preferred more than 98 wt. % of the lipids, preferably vegetable lipids, comprised in the composition are comprised in the core of the lipid globules.

In a preferred embodiment of the present invention it is required that the liquid lipid phase provided in step b) is fed into the aqueous phase provided in step a) prior to or during the mixing step c). In a preferred embodiment of the present invention the liquid lipid phase is fed into the aqueous phase with low pressure, preferably at most 10 bar, more preferably at most 8 bar.

The present invention in a preferred and advantageous manner requires to use a static mixer or an inline mixer with at least one mixing head, in particular with one, two, three or more mixing heads, preferably two mixing heads, in process step c), preferably which exert(s) a low shear force, for the preparation of the lipid and protein-component containing composition.

In a particularly preferred embodiment it is, however, in addition required to use the same shear forces, preferably low shear forces, also in process steps relating to the provided liquid lipid phase of step b), namely to process said provided liquid lipid phase under low shear forces, in particular to feed the liquid lipid phase provided in step b) under low shear force into the aqueous phase prior to or during mixing. In consequence thereof, the liquid lipid phase provided in step b) is during its processing in the present process preferably never subjected to higher shear forces.

Step c) of the process for preparing the lipid and protein component-containing composition according to the present invention requires the mixing of the lipid phase with the aqueous phase. Preferably, mixing is conducted at a ratio of 5 to 50% (w/w), preferably 10 to 40% (w/w), more preferably 15 to 30% (w/w) lipid to aqueous phase.

In case prior to step c) a premixing step is applied mixing is conducted at a ratio of 5 to 50% (w/w), preferably 10 to 40% (w/w), more preferably 15 to 30% (w/w) lipid to aqueous phase.

In the context of the present invention, a ratio of e. g. 5 to 50% refers to a ratio from 5 parts lipid:95 parts aqueous phase to 50 parts lipid:50 parts aqueous phase.

The temperature during mixing, i.e. step c) of the present process, preferably is from 40° C. to 90° C., preferably from 50° C. to 80° C., most preferred 70° C.

In the context of the present invention, the term "static mixer" refers to a device for mixing, in particular continuously, at least two fluid materials, in particular an aqueous phase and a liquid lipid phase, in particular refers to a mixer, which comprises a housing, an inlet, an outlet and at least one non-moving mixer element, wherein the housing is configured and formed in a way to force substantially all, preferably all, of the fluid to be mixed along the at least one non-moving mixer element. The housing and the at least one mixer element are designed so as to allow the fluid stream moving through the mixer to be blended by the non-moving mixer elements.

Thus, the present invention preferably requires to use a static mixer which is configured and operated so as to achieve the desired particle size distribution, in particular so as to achieve a pressure drop during the mixing step c) of 0.5 to 30 bar, preferably 1 to 15 bar, preferably 2 to 12 bar, preferably 2 to 10 bar, preferably 2 to 5 bar, preferably 3 to 5 bar. Said pressure drop is measured as the difference of the pressure determined at the inlet of the static mixer housing and the outlet of the static mixer housing. A skilled person can easily determine the configuration and set up of a static mixer, e. g. length and diameter of the mixing elements, to achieve the desired pressure drop.

In the context of the present invention, the configuration of said static mixer is preferably determined by the size and shape of the housing and the size and shape of the at least one mixer element contained therein. In the context of the present invention, the operating conditions used with the present static mixer are preferably the pressure applied at the inlet of the static mixer, the flow rate and the speed of the composition flowing through the static mixer.

In a preferred embodiment, the static mixer is operated with a flow rate of 1.5 to 8 l/min, preferably 2 to 7 l/min, preferably 2 to 6 l/min, preferably 5 to 7 l/min, preferably 4 to 6 l/min.

In a preferred embodiment of the present invention the lipid phase is mixed with the aqueous phase in step c) of the present preferred process, preferably in a circular cylindrical static mixer with a diameter of 2 to 10, preferably 3 to 7, preferably 4 mm with a flow rate from 1.5 l/min to 8 l/min, preferably 2.0 l/min to 7 l/min, most preferably 5 l/min to 7 l/min or 4 to 6 l/min.

In a preferred embodiment, the static mixer is operated with a speed of 0.3 to 2.5 m/s, preferably 0.5 to 2 m/s, preferably 0.5 to 1.5 m/s.

In a preferred embodiment of the present invention the lipid phase is mixed with the aqueous phase in step c) of the present process, preferably in a circular cylindrical static mixer with a diameter of 2 to 10, preferably 3 to 7, preferably 4 mm with a flow rate from 1.5 l/min to 8 l/min, preferably 2.0 l/min to 7 l/min, most preferably 5 l/min to 7 l/min or 4 to 6 l/min.

Preferably, the static mixer employing said flow rate has a housing with a diameter of 2 to 10, preferably 3 to 7, preferably 4 mm and a length from 80 to 150, preferably 90 to 110, in particular 100 mm.

In a preferred embodiment, the speed of the composition flow in the static mixer is from 5 to 40 m/s, preferably 10 to 30 m/s, preferably 10 to 20 m/s.

In a preferred embodiment of the present invention, the pressure applied at the inlet of the static mixer is from 2 to 30 bar, preferably 2 to 20 bar, preferably 2 to 15 bar, preferably 2 to 12 bar, preferably 2 to 10 bar, preferably 2 to 8 bar.

Thus, most preferred, the pressure drop equals the pressure applied at the inlet of the static mixer so that there is no pressure at the outlet of the static mixer. However, in another embodiment, the pressure applied at the inlet of the static mixer is greater than the pressure drop, so that there is a pressure of for example 5 bar, preferably 3 bar at the outlet of the static mixer.

The static mixer used in the present invention preferably has a cylindrical, for instance tubular, in particular pipe-like or tube-like, housing or a squared housing. Preferably, the housing is tubular, that means in form of a circular cylinder. The housing, preferably the tubular housing, has preferably a diameter of 3 to 10, preferably 3 to 8, preferably 4 mm. The housing comprises at least one inlet, preferably one or two inlets, for delivery of the incoming feed fluids. Within said housing at least one mixer element, preferably at least four mixer elements, for instance a baffle or a series of baffles, is positioned.

Preferably, the static mixer has at least 4, preferably at least 5, preferably at least 6 mixer elements. Most preferred, the static mixer has between 6 and 20, preferably 7 to 18, most preferred 8 to 16 mixer elements.

In a preferred embodiment of the present invention, the at least one mixer element has a length of 3 to 5 mm, in particular 4 mm.

Preferably, the housing of the static mixer has a length of 80 to 150, preferably 90 to 110 and preferably 100 mm.

In a preferred embodiment of the present invention, the housing, in particular the tubular housing has a diameter of 3 to 10, preferably 3 to 8, preferably 4 mm and a length of 80 to 150, preferably 90 to 110 and preferably 100 mm.

In a preferred embodiment of the present invention, the static mixer does not comprise any moving element, in particular no rotor and no rotating element.

In a preferred embodiment of the present invention, the at least one mixer element is of helical shape. Thus, such a static mixer is a helical static mixer. In a further preferred embodiment, the at least one mixer element is of plate-like shape. Thus, such a static mixer is a plate-type static mixer. Preferably, the at least one mixer element is able to produce simultaneously patterns of flow division and radial mixing.

Thus, to facilitate mixing according to a preferred embodiment of the present invention a static mixer is used. The static mixer disperses one liquid phase, i. e. the liquid lipid phase of the present invention, into a main continuous phase, i. e. the aqueous phase of the present invention, with which it would normally be immiscible in order to prepare a oil-in-water emulsion. Thus, for the mixing step of the present process preferably a static mixer is used to create an emulsion, preferably a stable emulsion, comprising lipid globules. Preferably, the lipid phase is emulsified in the aqueous phase under such conditions that large lipid globules are created.

In a preferred process employing steps a), b) and c), it is further preferred to premix the aqueous and liquid lipid phases provided in steps a) and b). Thus, the present invention in particular requires to provide in step a) an aqueous phase, to provide in step b) a liquid lipid phase and thereafter premix the liquid lipid phase with the aqueous phase prior to processing said premixed composition, in particular pre-emulsion, to step c), wherein the lipid with the aqueous phases finally mixed with the static or inline mixer. The premixing step may be performed in a batch mixer, in particular a propeller mixer. In a further preferred embodiment, premixing takes place during injection of the lipid phase into the aqueous phase without using a premixer. Preferably, this is realised using a dosing pump. In particular, the dosing pump injects or feeds the lipid phase into the aqueous phase in such a way that a turbulence is created in the aqueous phase, which leads to premixing of the two phases resulting in a coarse emulsion. Preferably, the dosing pump applies low pressure, in particular the pressure is lower than the pressure drop applied by the static mixer or lower than the pressure applied by the inline mixer.

Advantageously, premixing ensures that both, the aqueous phase and the liquid lipid phase, are fed in the right quantities to the static mixer. Since the resulting lipid droplets are still too large, no stable emulsion is formed during premixing.

In a preferred embodiment, the aqueous phase, the liquid lipid phase or most preferably both phases are prior to the premixing step heated to a temperature from 40° C. to 90° C., preferably 50° C. to 80° C., preferably of 70° C.

In the context of the present invention the term "inline mixer" refers to a mixer, which comprises a housing, an inlet, an outlet and at least one mixing head comprising at least one stator and at least one rotor, wherein the housing is configured and formed in a way to force substantially all, preferably all, of the fluid to be mixed through the at least one mixing head.

To facilitate mixing a medium or high speed inline mixer, with one or more mixing head(s) is preferably used. An inline mixer disperses one liquid phase, i. e. the liquid lipid phase of the present invention, into a main continuous phase, i. e. the aqueous phase of the present invention, with which it would normally be immiscible in order to prepare a oil-in-water emulsion. Thus, for the mixing step of the present process preferably an inline mixer is used to create an emulsion, preferably a stable emulsion, comprising lipid globules. Preferably, the lipid phase is emulsified in the aqueous phase under such conditions that large lipid globules are created. Preferably, the used inline mixer consists of a rotor, a set of rotors or rotating disc(s) and a same amount of stationary discs known as stator(s), wherein each pair of rotor or rotating disc and stator is referred to as mixing head. The rows of rods or pins positioned on both the rotor and stator discs create rapidly changing speed differences in a mixing head trough which the solutions to be mixed flow. Preferably, the lipid phase is added or injected into the aqueous phase shortly before entering the inline mixer.

Preferably already from this point onwards and including it, high shear forces are to be avoided in the process according to the present invention.

In general, shear is created in an inline mixer by the rotating and static pins of the mixing head through which the fluid is forced, that means the fluid experiences the speed of one rotating pin and then almost no speed at a static pin. Depending on the number of rows of pins on each disc this can be repeated several times. An inline mixer for preferred use in the present invention uses a rotating disc or high speed rotor, or a series of such inline rotors, also called mixing heads, usually powered by an electric motor, to create flow and shear, preferably low shear. Low shear is meant to refer to lower shear than applied during conventional homogenization. The velocity, or tip speed of the fluid at the outside diameter of the rotor will be higher than the velocity at the centre of the rotor, which creates shear. In an inline mixer, for preferred use in the present invention, the rotor-stator array or mixing head is contained in a housing with an inlet at one end and an outlet at the other. Such a housing can also contain more than one mixing head. Depending on the specific inline mixer model the fluid flows from the outside to the inside of the discs or vice versa. Mostly, the components to be mixed are drawn through the rotor-stator array in a continuous stream, with the whole acting as a centrifugal pumping device. Alternatively, a pump vane can be added to the mixer shaft. Thus, inline mixers offer a more controlled mixing environment and can preferably be used in the present process as part of a continuous production process, preferably resulting in a more economical production process.

Preferably, a medium or high speed inline mixer, in particular a high speed inline mixer, is used in the process according to the present invention.

In the present process it is preferred to avoid high shear forces. Thus, it is preferred to use lower shear force relative to standard homogenisation and spray-drying during the complete process, preferably at least from the fat injection point onwards and including it, that means during and after the step of feeding the liquid lipid phase into the aqueous phase, e. g. prior to or during mixing step c) and also during spray-drying.

In a preferred embodiment of the present process the inline mixer is used at 4000 to 15000 rpm, preferably 6500 to 12000 rpm. The speed might be lower depending on mixer design and diameter of the discs. In a preferred embodiment the inline mixer stirs the mixture with a speed of 20 to 50 m/s, preferably 30 to 50 m/s, more preferably 41 to 44 m/s at the tip. In a particularly preferred embodiment of the present invention, the speed is at least 25 m/s, preferably 25 to 60 m/s.

However, both of these parameters are largely dependent on the type and model and the size (diameter of rotor and stator) of the inline mixer used, in particular the mixing head, but can be determined by the skilled person. With a larger in line mixer for example there is the need for a lower rpm. Thus, exerted shear forces are adjusted accordingly to obtain the preferred large lipid globules. Advantageously and preferably, an inline mixer exerts tangential shear instead of elongational shear. Due to the preferred low tangential shear preferably employed by the present process the resulting lipid globules are larger than in standard infant formulae.

In general, homogenisation is used to emulsify the lipid phase in the aqueous phase to reduce creaming and oxidation of the fatty acids. In standard infant formulae rather small globules are produced leading to a very stable emulsion. Since the present process aims to produce larger lipid globules this might result in a less stable emulsion and more oxidation of fatty acids. Instead, it was found that with the composition produced by the present process excessive creaming did not occur within 24 h and when fatty acid oxidation was measured after 18 months of storage it was found to be acceptable. Surprisingly, it was even very similar to that observed with standard infant formula, despite an increased amount of free fat. The presence of a little bit of creaming was even found to be advantageous since it mimics the situation during breast feeding.

In a preferred embodiment of the present invention employing an inline mixer the lipid phase is mixed with the aqueous phase in step c) of the present process for a mixing time or residence time in the mixing head from 0.05 to 10, preferably 0.08 to 10, preferably 0.3 to 10, preferably 0.5 to 9, in particular 0.7 to 8, in particular 1 to 7, preferably 2 to 6, most preferably 3 to 5 seconds.

In a preferred embodiment the lipid and protein component-containing composition is obtained in step c) at a pressure of at most 10 bar, preferably below 10 bar, preferably at most 8 bar, preferably below 8 bar, more preferably at most 7 bar, preferably below 7 bar.

In a particularly preferred embodiment of the present process the lipid and protein component-containing composition obtained in step c) is then reheated to 75 to 85° C., preferably 78 to 80° C. to further reduce, preferably completely eliminate pathogenic bacteria. Advantageously, reheating at this stage also leads to a reduction of viscosity prior to spray-drying or atomization which in turn leads to an increased capacity of the spray dryer or atomization system.

Preferably, the lipid globules, also called lipid droplets, of the lipid and protein component-containing composition produced with the process according to the present invention have a volume-weighted mode diameter of at least 1 μm, preferably of at least 2 μm, more preferably of at least 3 μm, most preferred of at least 3.5 μm, even more preferably about 4 μm. Preferably, the volume-weighted mode diameter should be below 15 μm, preferably below 10 μm, more preferably below 8 μm. In particular, the lipid globules of the composition produced with the process according to the present invention have a volume-weighted mode diameter from 1 to 15 μm, preferably 2 to 12 μm, preferably 1 to 10 μm, preferably from 2 to 8 μm, more preferably from 3 to 8 μm, most preferred from 3 to 5 μm, preferably 4 to 7 μm, preferably from 4 to 5 μm.

Preferably, the lipid globules, also called lipid droplets, of the lipid and protein component-containing composition produced with a process according to the present invention are lipid globules, wherein at least 45%, preferably at least 57%, more preferably at least 60%, preferably at least 65%, preferably at least 70% (each % based on volume of the lipid globules) have a diameter from 2 to 12 μm, preferably 3 to 11, preferably 3 to 5 μm.

Preferably at least 45%, preferably at least 57%, more preferably at least 60% (based on volume) of the lipid globules have a diameter from 2 to 12 μm.

Advantageously, the lipid and protein component-containing composition comprising large lipid globules obtained in step c) of the present process has a lower apparent dynamic viscosity between 30 and 80 cP due to the higher temperature achieved by reheating. Compared to conventional processes a lowering of the viscosity of about 5 cP occurs. Advantageously, this reduction of viscosity leads in turn to an increased capacity during spray-drying.

Preferably, the spray-drying step using an atomization system, preferably a low shear atomization system, uses a pump, preferably a low pressure pump to control the feed of the composition obtained in step c) to the spray dryer. Preferably, said pump uses at most the shear forces applied by the inline mixer or static mixer of step c). Thus, it is preferred that the shear forces exerted on the lipid globules in the subsequent spray-drying step, in particular the feeding, in particular pumping, step do not exceed the shear forces experienced during mixing. Preferably, a positive displacement pump is used to control the feed of the mixture to the spray dryer. A positive displacement pump causes a fluid to move by trapping a fixed amount of the fluid and then displacing the trapped volume of fluid into the discharge pipe.

In case ingredients specified herein to be added either to the aqueous or the lipid phase are sensitive to the temperature(s) or conditions employed during any of the steps of the process according to the present invention they might also be added at a later point in the process, such as after mixing and before spray-drying or even after spray-drying.

The present invention also relates to a spray-dried lipid and protein component-containing composition comprising lipid globules with a volume-weighted mode diameter of at least 1 µm, preferably at least 2 µm, more preferably at least 3 µm, even more preferred at least 3.5 µm, most preferably about 4 µm, obtainable, preferably prepared, according to the process of the present invention. Preferably, the volume-weighted mode diameter should be below 15 µm, preferably below 10 µm, more preferably below 7 µm. In particular, the lipid globules of the composition produced with the process according to the present invention have a volume-weighted mode diameter from 1 to 15 µm, preferably 2 to 12 µm, preferably 1 to 10 µm, preferably from 2 to 8 µm, more preferably from 3 to 8 µm, preferably 3 to 5 µm, most preferred from 4 to 7 µm.

The present invention also relates to a spray-dried lipid and protein component-containing composition comprising lipid globules, wherein at least 45%, preferably at least 57%, more preferably at least 60%, preferably at least 65%, preferably at least 70% (each % based on volume of the lipid globules) have a diameter from 2 to 12, preferably 3 to 11, preferably 3 to 5 µm.

Preferably, the lipid globules, also called lipid droplets, of the spray-dried composition produced with a process according to the present invention are lipid globules, wherein at least 45%, preferably at least 57%, more preferably at least 60%, preferably at least 65%, preferably at least 70% (each based on volume of the lipid globules) have a diameter from 2 to 12 µm, preferably 3 to 11, preferably 3 to 5 µm.

Preferably, the spray-dried composition prepared by the process according to the present invention is a nutritional or pharmaceutical composition, preferably an infant formula or a follow-on formula or a growing up milk. A growing up milk is sometimes also referred to as milk-based drink for young children, and is intended for children of 1 to 6 years of age, more preferably young children of 1 to 3 years of age. Thus, preferably, the spray-dried composition is a powder suitable for making a liquid composition after reconstitution with an aqueous solution, preferably water. Advantageously, the size of the lipid globules and the coating with polar lipids, if present, remain the same after the spray-drying step and subsequent reconstitution. Preferably, the composition of the present invention is reconstituted, preferably with water, just prior to consumption. This will ensure stability of the emulsion, although a little bit of creaming can occur due to the large lipid globules of the present composition. A small amount of creaming is beneficial since this also closely resembles the conditions of breast feeding.

Thus, the spray-dried composition according to the present invention is preferably administered to a human subject with an age of at most 36 months, preferably of at most 18 months, more preferably of at most 12 months, even more preferably of at most 6 months. In particular, the composition obtained by the present process is suitable and prepared for providing the daily nutritional requirements to a human subject with an age of at most 36 months, in particular an infant with an age of at most 24 months, even more preferably an infant with an age of at most 18 months, most preferably with an age of at most 12 months. Hence, the spray-dried lipid and protein component-containing composition is used for feeding a human subject. Advantageously, it was found that the administration of a composition containing large lipid globules, preferably coated with polar lipids, prevents or reduces the risk of obesity and improves body composition, i. e. increases lean body mass and decreases fat mass, later in life.

After spray-drying, the composition of the present invention is suitably in a powdered from, which can preferably be reconstituted with water to form a liquid. In a preferred embodiment it is required, to add an aqueous medium, preferably water, to the spray-dried composition obtained so as to obtain a liquid or semi-liquid reconstituted spray-dried composition of the present invention. Thus, the present invention also relates to a liquid or semi-liquid composition comprising the spray-dried composition obtained after spray-drying according to the present process in an aqueous medium. When the composition is in a liquid form, the preferred volume administered on a daily basis is in the range of about 80 to 2500 ml, more preferably about 450 to 1000 ml per day. In reconstituted form the composition according to the present invention is also called ready-to-feed liquid.

In a further preferred embodiment of the present invention, the present solid spray-dried composition or the liquid or semi-liquid reconstituted composition may be supplemented with at least one further substance, in particular a pharmaceutically or nutritionally effective substance so as to obtain a pharmaceutical or nutritional composition comprising the present spray-dried or reconstituted liquid composition.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Further preferred embodiments of the present invention are subject of the subclaims.

The invention is further described by way of the following example and the accompanying figures.

Figure 2:
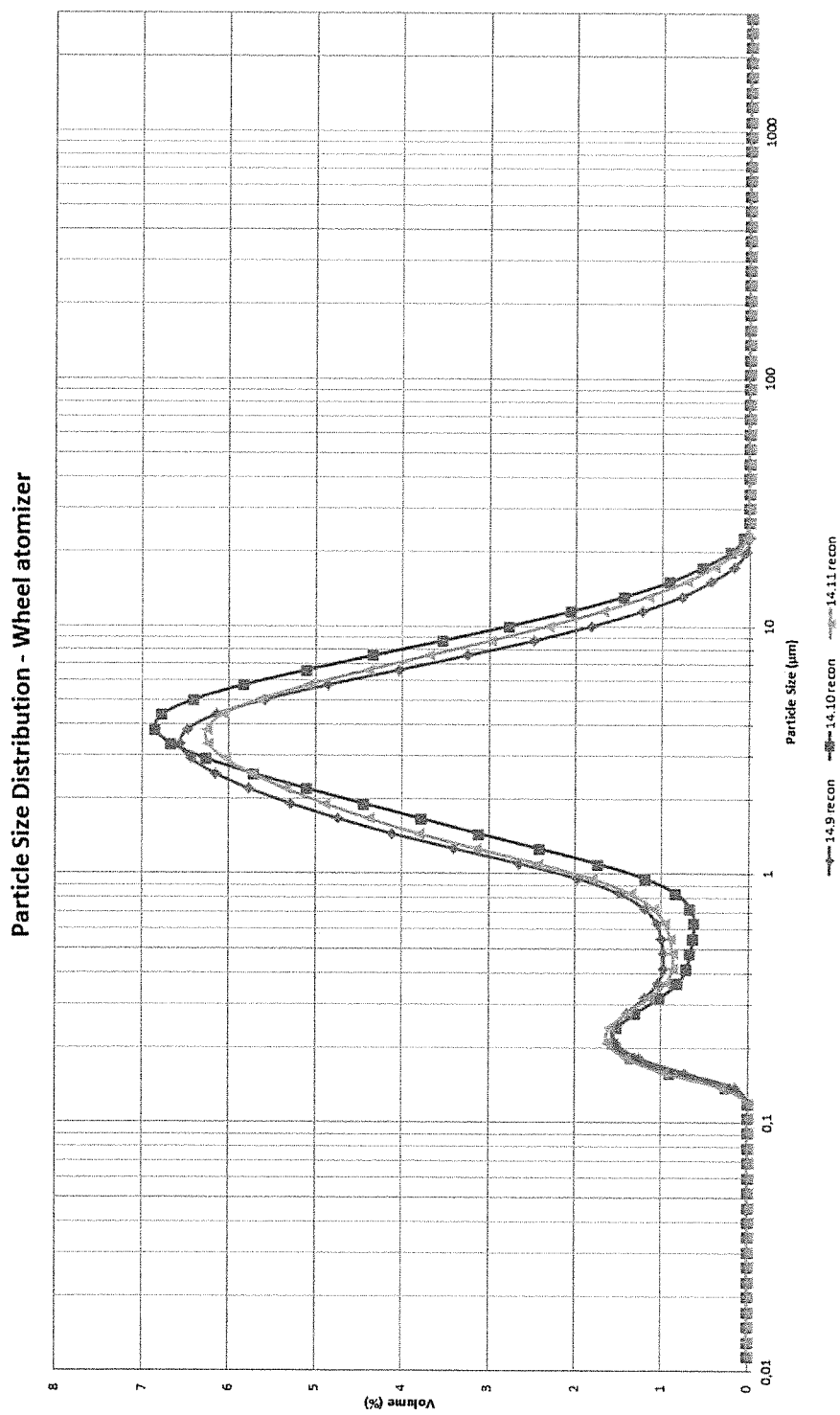

The figures show:

FIG. 1 shows a flow scheme of a process of the present invention, wherein comp. is short for components and panels with solid lines represent the aqueous phase, panels with double lines represent the lipid phase and panels with bold lines represent the mixture, i. e. the emulsion of both phases and FIG. 2 shows the particle size distribution of various preparations obtained after subjecting them to a rotary atomization system.

EXAMPLE

An infant formula was prepared being a powder comprising per kg final product about 4800 kcal, about 247 g lipid, about 540 g digestible carbohydrates, about 41 g non-digestible oligosaccharides and about 97 g protein. The composition was prepared using butter milk serum powder enriched in milk phospholipids, a vegetable oil blend (fat), demineralised whey powder (protein), lactose, and non-digestible oligosaccharides. Also vitamins, minerals, trace elements as known in the art were used.

The amount of butter milk serum powder was such that 1.62 wt. % phospholipids based on total lipids were present in the final composition.

An aqueous phase, comprising the butter milk powder, protein and digestible carbohydrates and the other ingredients, except the fat and fat soluble vitamins, was prepared as known in the art and heat treated to prevent bacterial contamination, namely by an Ultra High Temperature (UHT) treatment, as known in the art, after which an evaporation step was applied. The dry matter content of the aqueous phase was between 30 to 48 wt. % after the evaporation step. The mixture was heated to 50° C.

A fat phase was prepared as known in the art. The vegetable oil blend was also heated to 50° C. and added to the water phase in a w/w ratio of between 15 to 30 by injection and a centrifugal booster pump. The total solid content of the fat and aqueous phase mixture was between 40 and 60 wt %.

Accordingly, the aqueous and fat phase were fed into the inline mixer (Ystral Z80) comprising one mixing head. The rotor stator design of the inline mixer had 3 rows of teeth. The aqueous and fat phase were mixed with a tip speed of 20 to 50 m/s (resulting in a low shear rate 25 s$^{-1}$) in order to emulsify the lipid phase into the aqueous phase and thereafter pumped with a positive displacement pump, a mono pump, with a pressure of about 8 bar to the heater.

The oil in water mixture was subsequently fed via the concentrate heater to the spray dryer, driven by the pump used downstream of the inline mixer (FIG. 1).

The emulsion was atomized with a low shear atomization system employing a wheel atomizer in a NIRO-25 spray dryer and dried with the inlet temperature of the drying gas being 175° C. or 193° C.

Atomization was performed with a rotary atomizer with different settings. The setting variations were dryer inlet temperature and rotational speed of the rotary atomizer.

The size of the lipid globules in the final powder, after reconstitution with water, was measured with a Mastersizer 2000 (Malvern Instruments, Malvern UK). About 60% of the lipid globules based on lipid volume had a diameter from 2 and 12 μm.

Settings were according to the following overview of the table and after measurement a corresponding mode diameter based on volume of lipid globules was found.

TABLE 1

| Sample code | Tip speed (m/s) | Wheel speed (rpm) | Dryer inlet temp. | Volume-weighted Mode diameter (μm) |
|---|---|---|---|---|
| Setting 1 - product | 14.9 | 90 m/s | 14000 | High (193° C.) | 3.143 |
| Setting 2 - product | 14.10 | 70 m/s | 11000 | High (193° C.) | 3.645 |
| Setting 3 - product | 14.11 | 90 m/s | 14000 | Low (175) | 3.361 |

After reconstitution the particle size distribution given in FIG. 2 was found.

All settings resulted in lipid droplets with a volume-weighted mode diameter of more than 1 μm, in particular from 2 to 5, in particular 3 to 4 μm.

The example shows that using a wheel atomizer in a spray dryer can produce a powder which has a desired, natural-like mode diameter based on volume of lipid globules after reconstitution of the powder with water.

The invention claimed is:

1. A process for preparing a spray-dried lipid and protein component-containing composition, selected from a group consisting of a spray-dried infant formula, a follow-on formula, and a growing up milk, the spray-dried lipid and protein component-containing composition having liquid globules, the process comprising:

spray-drying a lipid and protein component-containing composition having lipid globules with an atomization system employing a rotary atomizer so as to obtain a spray-dried lipid and protein component-containing composition having lipid globules with a volume-weighted mode diameter of at least 1.0 μm, and/or lipid globules wherein at least 45 vol. % of said lipid globules have a diameter from 2 to 12 μm, wherein the lipid and protein component-containing composition to be atomized has a dry matter content of 30 to 65 wt. %.

2. The process according to claim 1, wherein the rotary atomizer is operated with a tip speed of 50 to 120 m/s.

3. The process according to claim 1, wherein an inlet temperature for a drying gas used for spray-drying is at least 180° C.

4. The process according to claim 1, wherein the lipid and protein component-containing composition used for spray-drying is prepared by a process, comprising:

a) providing an aqueous phase with a dry matter content of 10 to 60 wt. % based on total weight of the aqueous phase, which includes at least one protein component;

b) providing a liquid lipid phase, which includes at least one lipid; and c) mixing the lipid phase with the aqueous phase in a ratio of 5 to 50% (w/w) using a static mixer or an inline mixer with at least one mixing head so as to obtain a lipid and protein component-containing composition comprising lipid globules.

5. The process according to claim 4, wherein the liquid lipid phase provided in step b) is fed into the aqueous phase provided in step a) prior to or during mixing step c).

6. The process according to claim 4, wherein the inline mixer with at least one mixing head is used at 4,000 to 15,000 rpm.

7. The process according to claim 4, wherein the lipid globules obtained in step c) have a volume-weighted mode diameter of at least 1.0 μm and/or wherein at least 45 vol. % of the lipid globules obtained in step c) have a diameter from 2 to 12 μm.

8. The process according to claim 4, wherein the protein component is selected from the group consisting of skim milk, whey, whey protein, whey protein isolate, whey protein hydrolysate, casein, casein hydrolysate and soy protein.

9. The process according to claim 4, wherein the aqueous phase comprises at least one further component selected from the group consisting of digestible carbohydrates, non-digestible carbohydrates, vitamins and minerals.

10. The process according to claim 4, wherein the liquid lipid phase is heated to a temperature of at least 40° C. prior to being fed into the aqueous phase.

11. The process according to claim 4, wherein the inline mixer with at least one mixing head in step c) mixes the lipid and aqueous phases with a tip rotor speed of 20 to 50 m/s.

12. The process according to claim 4, wherein the static mixer used in step c) is operated with a flow rate of 1.5 to 8 l/min.

13. The process according to claim 4, wherein the lipid and protein component-containing composition obtained in step c) is obtained at a low pressure of at most 10 bar.

14. The process according to claim 4, wherein the aqueous phase is provided with a dry matter content of 30 to 50 wt. % based on total weight of the aqueous phase.

15. The process according to claim 4, wherein subsequent to step a) and prior to step c) the aqueous phase is sterilised or pasteurised.

16. The process according to claim 4, wherein the lipid and protein component-containing composition obtained in step c) is reheated to 75 to 85° C.

17. The process according to claim 4, wherein the aqueous phase, the lipid phase, or the aqueous and the lipid phase comprise polar lipids, in particular phospholipids in an amount of 0.5 to 20 wt. % based on total lipid of the composition.

18. The process according to claim 4, wherein the aqueous phase further comprises lactose.

* * * * *